United States Patent [19]

Neubauer

[11] Patent Number: 5,671,398

[45] Date of Patent: Sep. 23, 1997

[54] METHOD FOR COLLAPSING A VERSION TREE WHICH DEPICTS A HISTORY OF SYSTEM DATA AND PROCESSES FOR AN ENTERPRISE

[75] Inventor: Ronald Jay Neubauer, Thousand Oaks, Calif.

[73] Assignee: Unisys Corporation, Blue Bell, Pa.

[21] Appl. No.: 470,582

[22] Filed: Jun. 9, 1995

[51] Int. Cl.$^6$ ........................................... G06F 17/30
[52] U.S. Cl. ........................ 395/500; 395/601; 395/619; 395/712
[58] Field of Search ............................ 395/601, 712, 395/619, 600

[56] References Cited

U.S. PATENT DOCUMENTS

| | | | |
|---|---|---|---|
| 4,912,637 | 3/1990 | Sheedy et al. | 395/619 |
| 5,303,367 | 4/1994 | Leenstra, Sr. et al. | 395/613 |
| 5,315,709 | 5/1994 | Alston, Jr. et al. | 395/606 |
| 5,317,729 | 5/1994 | Mukherjee et al. | 395/603 |
| 5,347,653 | 9/1994 | Flynn et al. | 395/619 |
| 5,386,559 | 1/1995 | Eisenberg et al. | 395/617 |
| 5,504,879 | 4/1996 | Eisenberg et al. | 395/611 |
| 5,557,793 | 9/1996 | Koerber | 395/614 |

OTHER PUBLICATIONS

Dittrich et al. "Version Support for Engineering Database Systems" IEEE Transactions on Software Engineering, vol. 14, No. 4, Apr. 1988.

Primary Examiner—Kevin J. Teska
Assistant Examiner—Nicole L. Dehlitsch-Moats
Attorney, Agent, or Firm—J. Ronald Richebourg; Mark T. Starr; Steven R. Petersen

[57] ABSTRACT

The method of the present invention is useful in a computer system having a user interface, a memory, a database and a repository operative in the computer system for accessing the database. The method is implemented by the computer system for collapsing a version tree that depicts a history of objects stored in the database. The method, which is stored in the memory at run-time, comprises the steps of validating collapse request by insuring that the target object is not a ghost object, the end object is not a ghost, the end object is on the same version tree as the target object, and the end object is a later version than the target object. An empty array representing path objects is initialized from the target object to the end object; and if an end object is supplied, a function is called to build up an array of objects representing paths from the target object to the end object. The array of objects built up in the preceding steps is processed. For each nextVersion of the target object, a function is called to collapse the versions starting from nextVersion; and, a function is also called to destruct the target object.

23 Claims, 16 Drawing Sheets

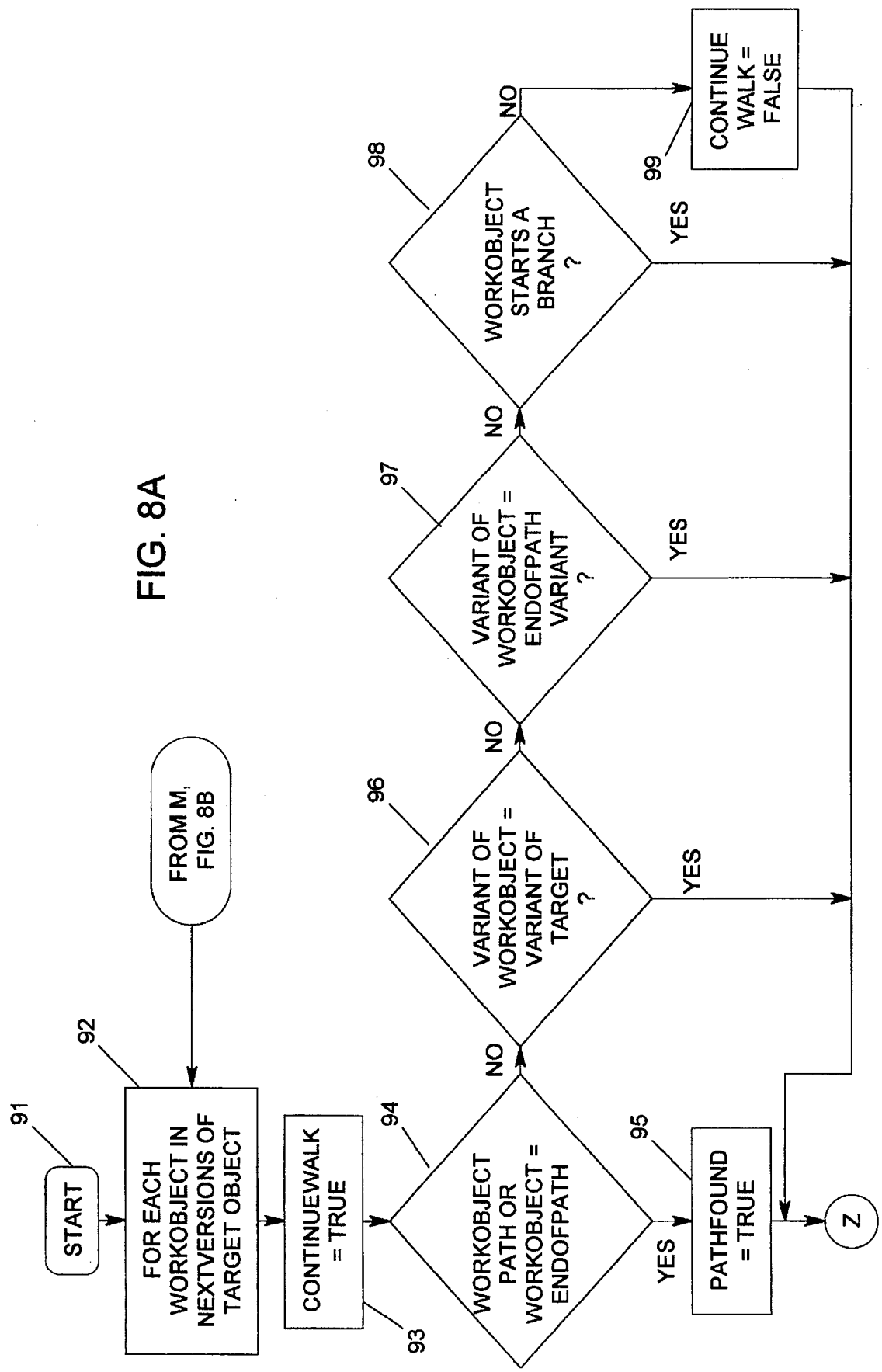

METHOD FOR COLLAPSING A VERSION TREE WHICH DEPICTS A HISTORY OF SYSTEM DATA AND PROCESSES FOR AN ENTERPRISE

FIELD OF THE INVENTION

The present invention relates in general to the field of repository databases and in particular to a method for collapsing a version tree representing stored system data and processes for an enterprise.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required to not only maintain a history of system data and processes for an enterprise, but also a method for collapsing all or parts of a version tree depicting such history of system data.

The version service enables users to record changes to objects over time and thus to maintain information about the previous states of these objects. Each of these states is maintained in a separate physical object in the repository. As time goes on and the number of evolutionary states of a versionable object increases, it may be desirable to reduce the number of historical states of the object for several reasons. For example, at some point in time a variant branch was created. Over time multiple historical states and later sub-variant branches from this branch were created. Subsequently, it may be determined that this path was only a trial balloon which had no future and there was no need to retain the information on this branch.

In the course of evolving from one state to another, a versionable object actually had many small incremental changes, possibly including branches which were broken out and later merged back into the historical path. When the desired state was finally achieved, it was determined that there was no need to retain all of the interim incremental steps, but only the earlier state and the final state.

The method of the present invention provides the user of the repository with the ability to accomplish the above-stated results with a minimum of operation requests. Moreover, since versioned object destruction is limited to leaf nodes in a version tree, it would not be possible for the user to achieve the same end with a set of calls to destruct individual versioned objects in the tree. The method described hereinafter may be used in one of two different forms. In one form (by identifiers), a message is sent to any object in the version tree and the parameters identify the variant branch to be collapsed (by variant branch name) and the earlier and later versions (by version number). In the second form (by end object), a message is sent to the earlier object and a reference to the later object is passed as a parameter. In both forms, the user indicates whether or not sub-branches may also be removed. If this parameter is FALSE and any sub-branches emanate from any object on the historical path between the earlier and later version, the request fails. If the parameter is TRUE and such sub-branches are encountered, the objects on these sub-branches will be removed along with the objects on the variant branch from the earlier version to the later version.

BRIEF SUMMARY OF THE INVENTION

It is therefore an object of the present invention to provide an improvement to a repository system.

It is another object of the present invention to provide an improved repository which supports a method for collapsing a version tree depicting a history of system data and processes in an enterprise.

The method of the present invention is useful in a computer system having a user interface, a memory, a database and a repository operative in the computer system for accessing the database; The method is implemented by the computer system for collapsing a version tree that depicts a history of objects stored in the database. The method comprises the steps of validating a collapse request by insuring that the target object is not a ghost object, the end object is not a ghost, the end object is on the same version tree as the target object, and that the end object is a later version than the target object. Next, an empty array representing path objects from the target object to the end object initialized. If an end object is supplied, a function is called to build up an array of objects representing paths from the target object to the end object. The array of objects built up in the preceding steps is processed. For each nextVersion of the target object, a function is called to collapse versions starting from the nextVersion. A function is called to destruct the target object; and all objects between the target object and the end object are collapsed.

BRIEF DESCRIPTION OF THE DRAWINGS

FIGS. 8A and 8B is a flow chart showing the steps of a; recursive process for building the path to collapse.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
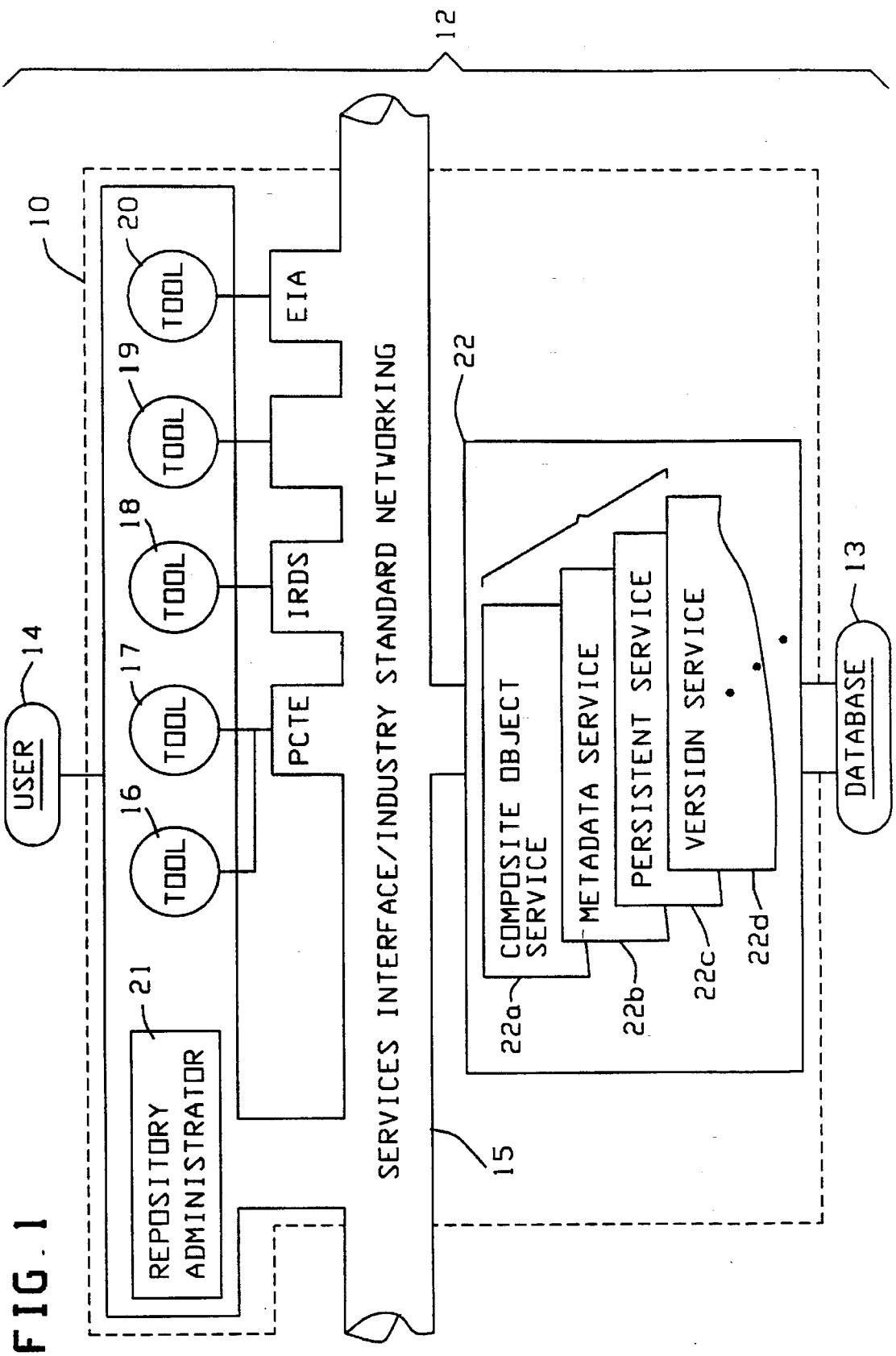
FIG. 1 is a block diagram of a computer system showing the various components of hardware and software that support a repository employing the method of the present invention.

Referring now to the drawings and FIG. 1 in particular, a block diagram is shown of a computer system 12 including a repository 10 that may use the method of the present invention. The repository 10 is illustrated as being supported by or a part of an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22a, which is disclosed in a U.S. Pat. No. 5,557,793 assigned to the assignee of this application and entitled IN AN OBJECT ORIENTED REPOSITORY, A METHOD OF TREATING A GROUP OF OBJECTS AS A SINGLE OBJECT; and MetaData Service 22b, which is disclosed in a copending patent application Ser. No. 08/382,303 also assigned to the assignee of this application and entitled A METHOD FOR SUPPORTING OBJECT MODELING IN A REPOSITORY. Another library service, Persistent Service 22c, deals with definition, tracking and maintenance of objects that continue to exist beyond the execution of a particular tool or of the repository itself. Yet another library service, Version Service 22d, is disclosed in U.S. Pat. No. 5,581,755 assigned to the assignee of this application and entitled A METHOD FOR MAINTAINING A HISTORY OF SYSTEM DATA AND PROCESSES FOR AN ENTERPRISE. The method of the present is a feature of the version service 22d. It is noted that many more types of library services may form a part of such a repository, the details of which are beyond the scope of this disclosure.

The repository employing the present invention provides a client/server architecture in which clients, i.e. tools 16–20, request services form the server, i.e. the repository 10 and its service library 22. In return, the repository and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in C++ programming language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The method of the present invention, which is a feature of the version service 22d, enables the user to collapse all or a portion of a version tree within a complex structure previously stored in the repository. The version service 22d enables a user to record changes to objects over time and thus maintain information about the previous states of these objects. In other words, version information provides a history of the system, data and processes for an information system.

At this juncture of the description several definitions would be helpful.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values.

The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations—defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes.

A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:

Attribute

A property for which the value is embedded within the owning object. For example, an employee's social security number can be defined as an attribute whose value is stored as a string within the employee object.

Reference

A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

TABLE I

| Type | Description |
| --- | --- |
| Array | Creates a dynamic array of objects in which an integer index can be used to access array members. An array can contain duplicate objects. |
| List | Creates an ordered collection of objects. A list can contain duplicate objects. |
| Set | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation.

If an operation has no parameters, a caller merely invokes the operation for the desired object. For example, consider the following features:

TABLE II

| Type | Feature | Domain/Return Type |
| --- | --- | --- |
| Employee | birthDate (attribute) | Date |
|  | age (operation) | Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters.

When an operation has parameters, each parameter has semantics similar to those of properties. Each parameter has a name, a domain type, and a set of options that can be used to affect the behavior of the parameter. The following table shows an example of an operation, defined for the Employee type, that has parameters:

TABLE III

| Operation | Parameter | Parameter Domain | Parameter Options |
| --- | --- | --- | --- |
| setSalary | amount | Real | REQUIRED |
|  | authorizedBy | Manager | REQUIRED |
|  | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a collection of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a collection of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Methods

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

Objects

An object is an abstract representation of a real-world concept or thing-such as a person, a software package, or an event-that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

A Component Object is a versioned object (i.e., a particular historical state of an object) that is part of a composite object. The relationship of the component object to the composite object is defined by a composition relationship. A component object can itself be a composite object. In this case, the component object contains other component objects related to it by composition relationships. A component object can belong to several composite objects. This feature promotes sharing of objects in the repository.

A Composite Context is a type that defines the scope of a composite hierarchy. The composite context identifies the top object for the hierarchy and the ghost objects that were created while the context was the current composite context. The term ghost as used herein means a value associated with a changeable object. Objects with ghost status can only be viewed in certain situations, i.e. they are only visible in the context in which they were created.

A Composite Hierarchy is a tree structure composed of a composite object and its component objects. The hierarchy also includes the component objects for any component object that is itself a composite object. Thus, this structure defines the component objects of the top, or root object, the components of those components, and so on to the bottom of the hierarchy.

A Composite Object is a versioned object for which at least one composite relationship is defined thus allowing the object to have components. A composite object can be thought of as owning its component objects. Some examples of these are: a car engine-the component objects include spark plugs, wires and pistons; a program-the component objects include files, record layouts and modules; a menu-the component objects are the various selections on the menu.

A Composite Relationship is the relationship that links a composite object to its component objects. The relationship between a car engine and its parts-spark plugs, pistons, wires and so on-can be used to illustrate a composite relationship. The car engine and its components can be treated as a single object, yet each of the parts can be accessed individually.

The term Visibility is used with versioned objects whose reserveStatus value is ghost. A ghost object is visible only in the composite context in which it was created. When this composite context is the current object, one can change the attributes of the ghost object, add or remove an object from the attributes of another object and so on.

Figure 2:
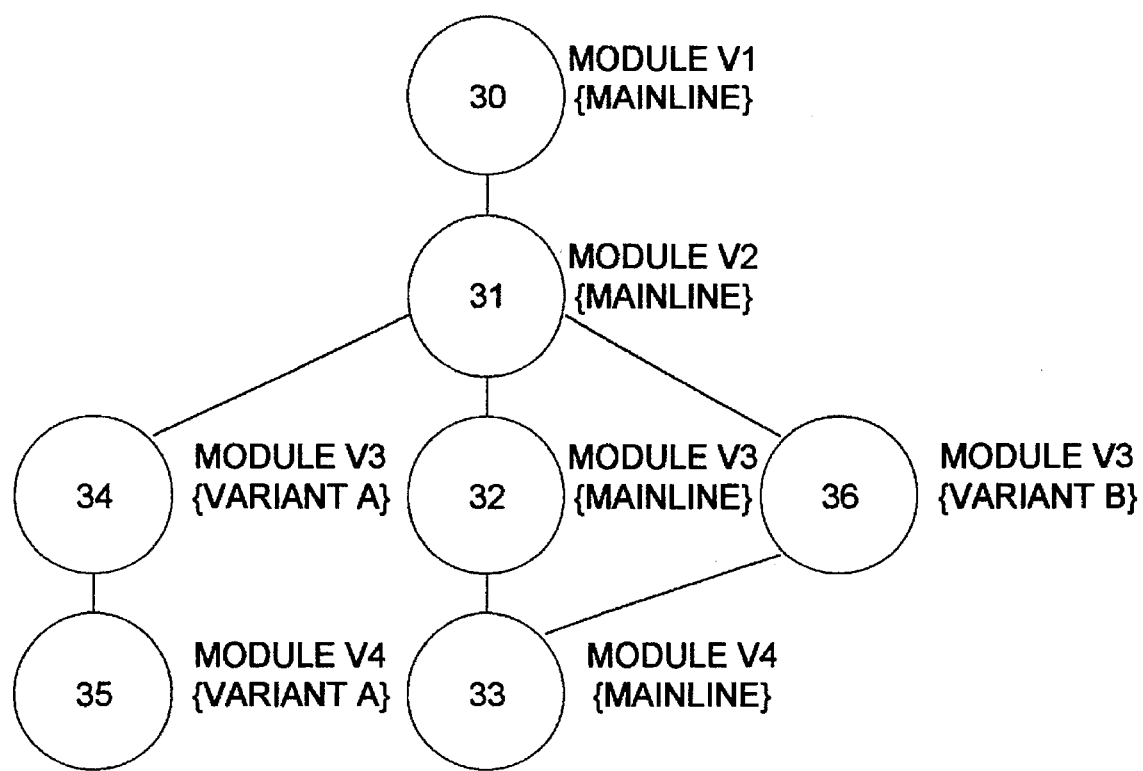
FIG. 2 is a version tree for a versionable repository object called Module.

A Versionable Object is a repository object for which the version service records state changes over time. Each Module in FIG. 2 is a versionable object. A Versioned Object is a repository object that represents a particular historical state of a versionable object. In FIG. 2 each circle stands for a versioned object that represents a particular state of Module.

Referring now to FIG. 2, a version tree is shown which represents the historical states of a versionable object in the repository. In particular, FIG. 2 shows an example of a version tree for a versionable repository object called Module. The following definitions will be helpful in understanding this invention when taken in conjunction with the tree shown in FIG. 2.

A Variant Branch, which represents a single line of development, is a subset of versioned objects in a version tree. The variant branch is a linear path that shows the history of changes from one versioned object to another for a particular line of development. In FIG. 2, the version tree has three variant branches-mainline, variant A and variant B. The mainline branch is made up of objects 30 through 33. The variant A branch is the path including objects 34 and 35 (labeled Module v1 {mainline} and Module v4 {variant}). The variant B branch is the path including object 36 (labeled Module v3 {variant B}).

A Variant is a versioned object on a variant branch. A version tree can contain multiple variants at the same level of ancestry. The terms Variant and Versioned Object are interchangeable. In FIG. 2 there are two variants of Module-object 34 on the variant A branch and object 33 on the mainline branch-as the final level (v4) The method of the present invention identifies each variant by its version number and its variant name.

A Version Number is the first of two identifiers used by the method of this invention to distinguish a versioned object in a version tree. This number is an integer that represents a level of ancestry in the version tree. In FIG. 2 the version number is represented by a lowercase "v" followed by an integer. For example, the root Module is labeled v1. At the second level of the graph, the object derived from the root object is labeled v2.

The Variant Name is the second of two identifiers used to distinguish a Versioned Object in a version tree. This name is a string that distinguishes a particular variant branch in the version tree. The Variant Name supports the maintenance of parallel lines of development. A Versioned Object can have many descendant variants representing different lines of development. In FIG. 2 the Variant Name is shown in braces. For example the main line of development is labeled {mainline}.

The version service 22d uses the check-in/check-out model for creating and controlling versions of objects. This model requires that a versioned object be checked out before it can be modified. This step places the object in a state in which it can be modified. When the modifications have been completed the versioned object must be checked back in. As the objects are checked in and out, the reserved status changes. The version service enables one to determine whether the history of certain state changes to versionable objects should be retained.

Specifically, the version service 22d enables one to modify properties defined as not significant without checking out the object. If one does not check out the object, the version service does not maintain a record of the changes. It should be pointed out however that the version service automatically checks out an object if a user makes a change to a significant property of that object.

The reserve status of a versioned object indicates the visibility and availability of the object for different operations. The reserve status is determined by the value of the reserveStatus property defined for the repository VersionedObject type.

The reserve status of a versioned object can be one of the following values:

TABLE IV

| Value | Description |
| --- | --- |
| available | indicates that the versioned object has no successor objects and therefore can be reserved. |
| readOnly | indicates that the versioned object has a successor object on the same variant branch and therefore can be reserved only if the user defines the variant parameter for the reserve operation. |
| source | indicates that the versioned object has successor objects, but that none of the successor objects are on the same variant branch as the versioned object. Therefore, the variant name is optional when reserving the object. |
| ghost | indicates that the versioned object can be modified. The object is visible only if it is checked out in the current composite context. |

The reserve status is set when the following operations defined for the repository VersionedObject type are used:

TABLE V

| Operation | Description |
| --- | --- |
| merge | Checks out a versioned object by merging the current versioned object with a designated object. |
| replace | Checks in a previously reserved versioned object and sets the reserveStatus property value to available. |
| reserve | Checks out a versioned object by creating a copy of the object, and sets the reserveStatus property value of the copy to ghost. |
| unreserve | Deletes the ghost object for a previously reserved versioned object. If there are no more next versions, the operation sets the reserveStatus property value of the object to available. |

Figure 3:
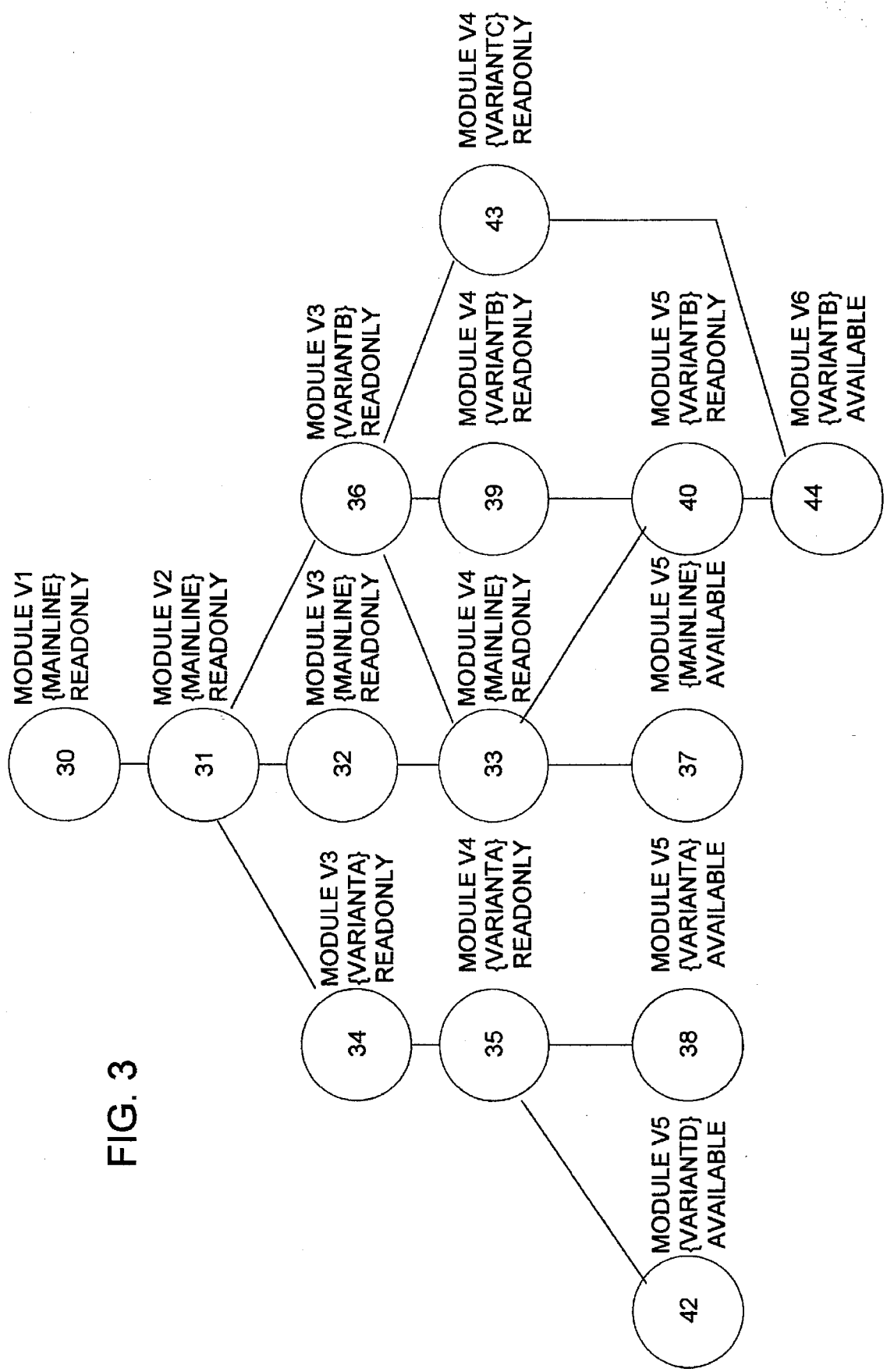
FIG. 3 is a more complex version tree on which the method of the present invention may also be used.

Referring now to FIG. 3, a more complex version tree is illustrated, which tree is helpful in understanding the steps performed by the method of the present invention. Like reference numerals are used in FIG. 3 to show expansion of the version tree shown in FIG. 2. To create another variant on the mainline branch, such as module v5 (object 37), the user calls the reserve operation for module v4 [mainline]. The user defines the variant parameter of this operation as a "." (period). The reserve operation thus creates the new object 37 on the same variant branch as the object being reserved. The reserve operation sets the reserve status of the new object 37 as ghost; and, it derives the other property values for the new object from the object being reserved, i.e. module v4 [mainline]. The reserve operation also changes the reserve status of the object being reserved, module v4 [mainline], to readOnly. To make the new object 37 visible to other users, the operator calls the replace operation for this object. The replace operation sets the reserve status of module v5 [mainline] (object 37) to available.

Object 38 (module v5 [variantA]) is created the same way off of object 35 as object 37 was created off of object 33. In a similar manner, object 39 is created off of object 36 (module v3 [variantB]), by repeating the above steps for each of the objects so created.

Object 42 (module v5 [variantD]) is created off of object 35 by use of the reserve operation. However, in this case a name is assigned to the branch by defining the variant parameter as variant D. In a similar manner, object 43 is created off of object 36 by the same reserve status operation.

Figure 4:
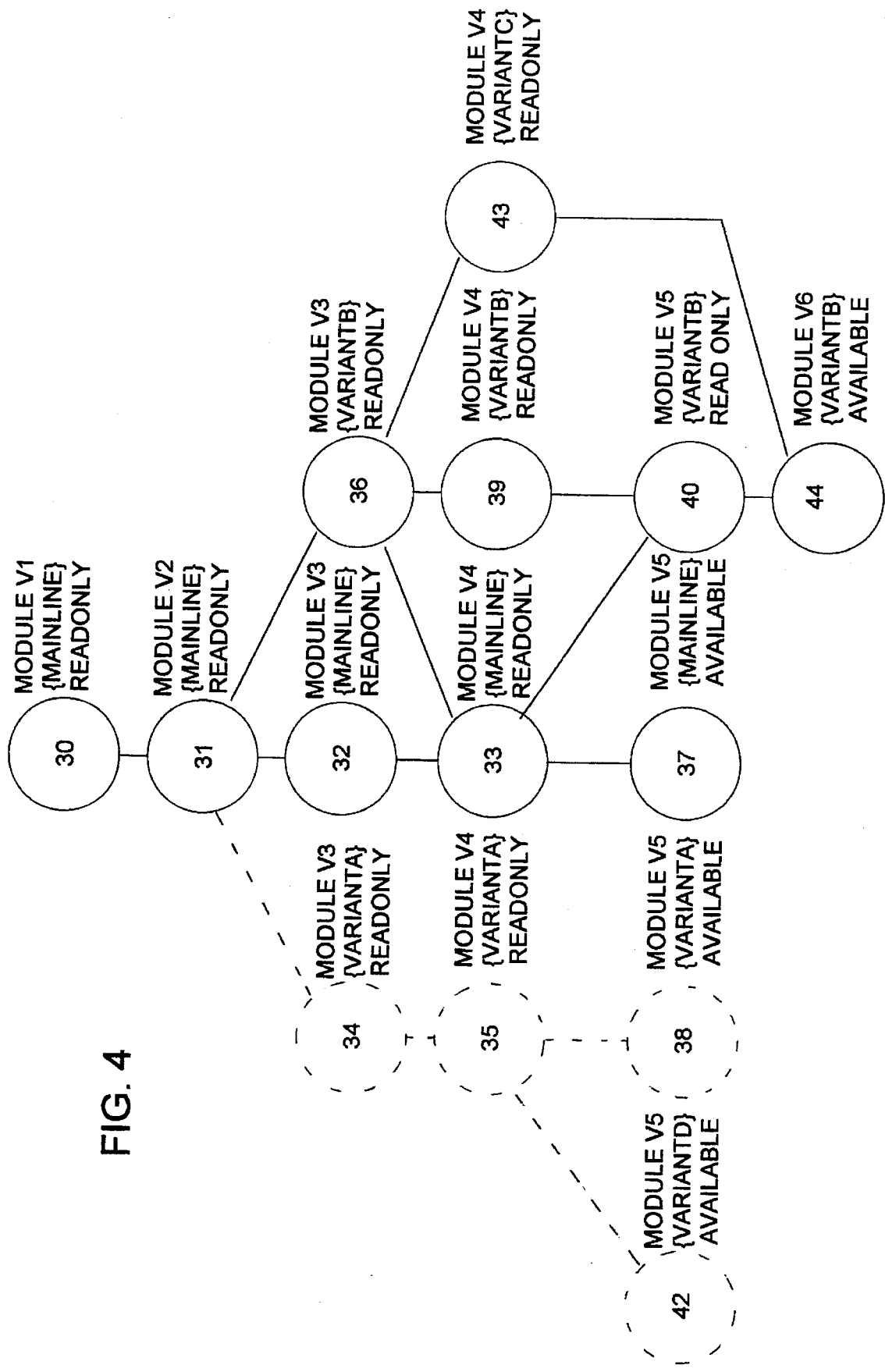
FIG. 4 is a diagram of the version tree of FIG. 3 illustrating a collapse of variantA.
Figure 5:
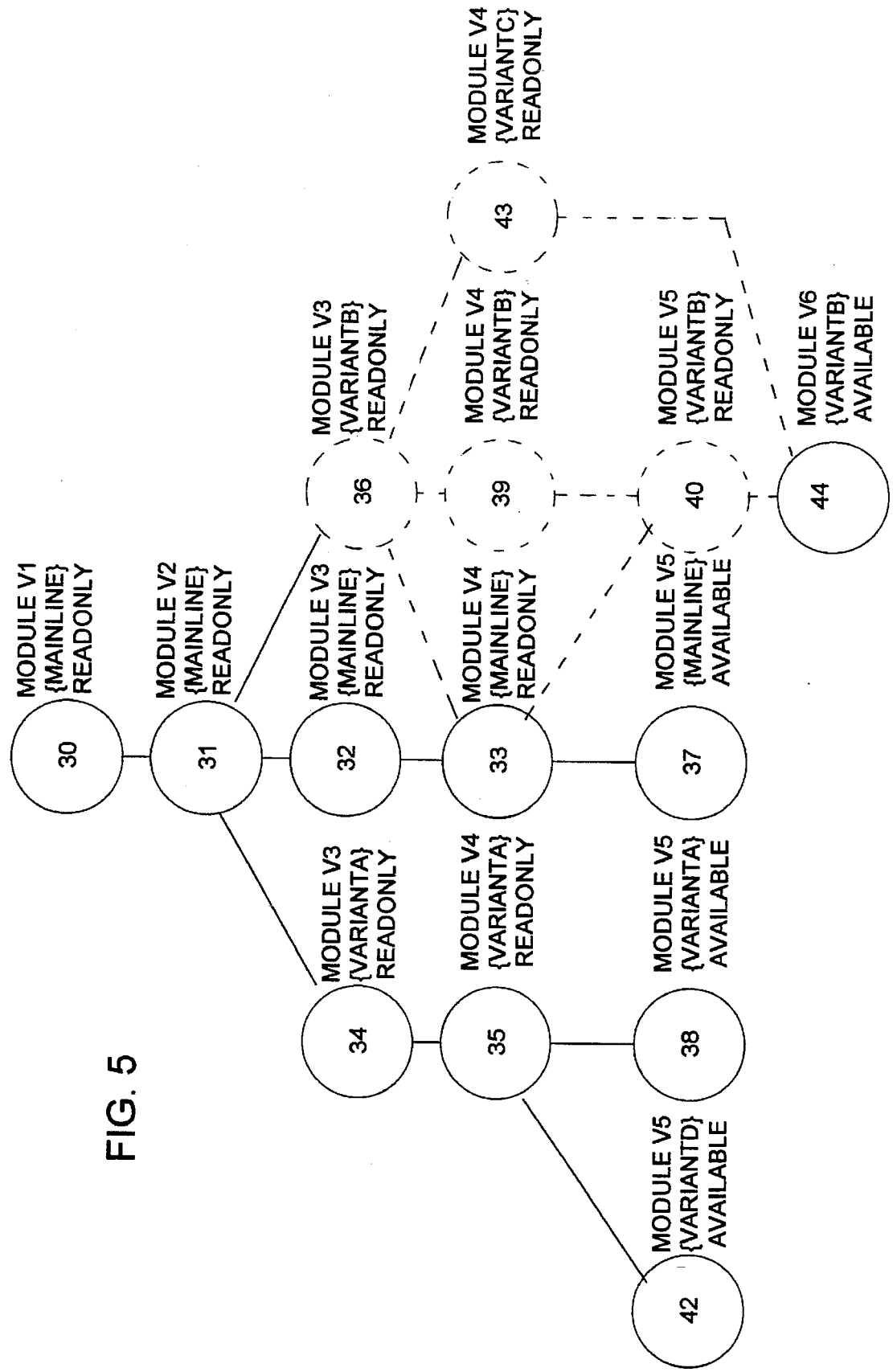
FIG. 5 is a diagram of the version tree of FIG. 3 illustrating a collapse of variantB.

The user can merge an object from one variant branch into an object on a different variant branch by calling the merge operation defined for the repository VersionedObject type. For example, object 40 is derived by merging object 33 with object 39, and object 44 is derived by merging object 43 with object FIG. 4 shows the version tree of FIG. 3 after the Module v3 [variantA] has been collapsed by using this Module as the target object and null as the end object. The operation is to remove all sub branches. As a result of this operation all objects on the variantA branch starting from v3 and all subbranches which emanate from any of these objects are deleted from the version tree (i.e., objects 34, 35, 38 and 42 are deleted). It is noted that if either the Module v5 [variantA] or Module v5 [varinatA] had been ghost, the operation would have failed. Another example of the version tree after a collapse operation is shown is shown in FIG. 5. Here the target object is Module v3 [variantB] and the end object is laterVersion Module v6 [variantB]. The operation is to remove all subbranches. As a result of this operation all objects on variantB from v3 (inclusive) up to but not including v6 are deleted. The variantC subbranch is also deleted. Hence, objects 39, 43 and 44 are deleted. Module v6 [variantB] now takes the place of Module v3 [variantB] in the version tree. Note that the previous versions-next versions relationships which had existed with Module v4 [mainline] are no longer present.

Figure 6A:
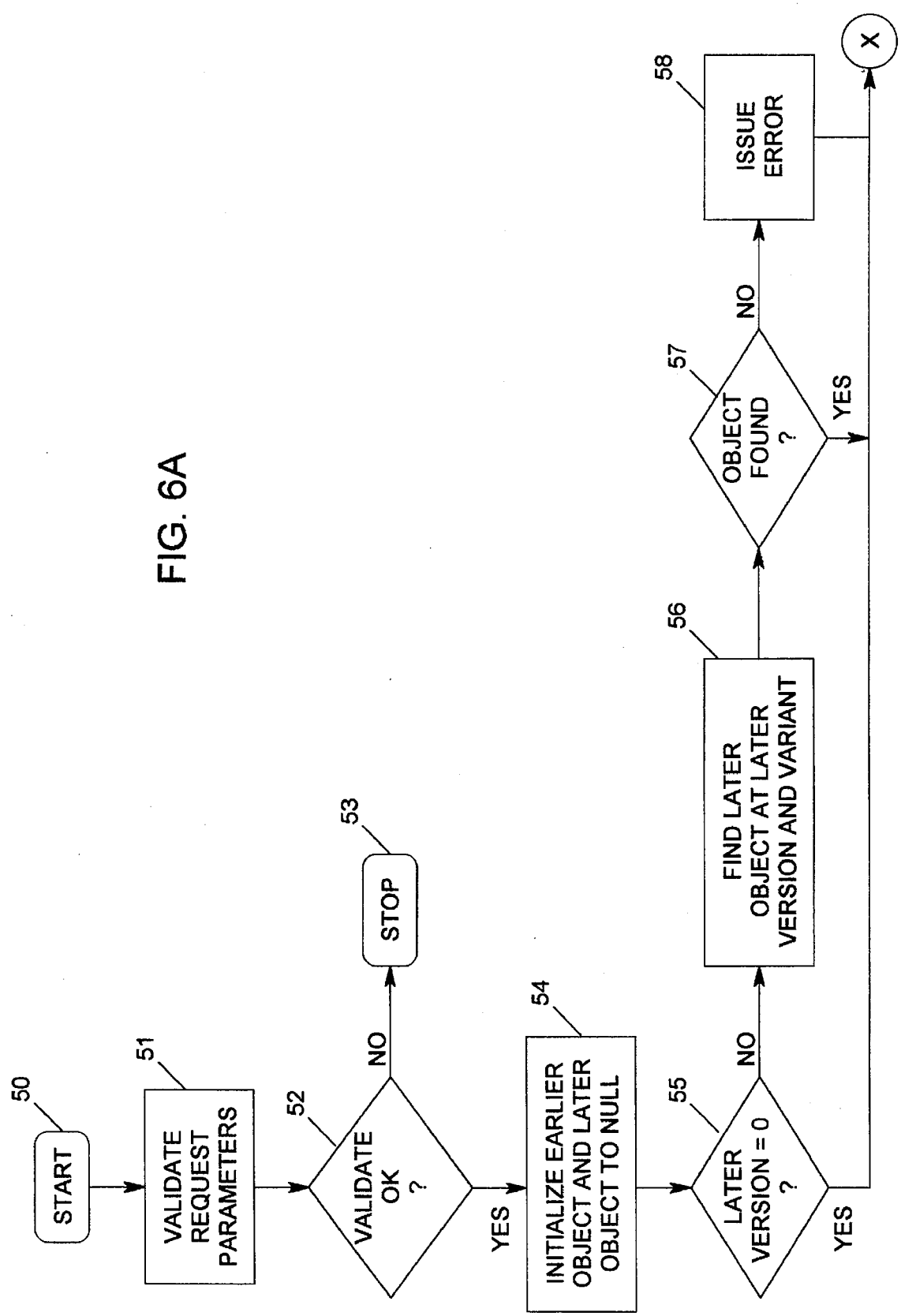
FIGS. 6A and 6B combined are a flow chart that illustrates the; collapsing of a version tree by providing identifiers.
Figure 6B:
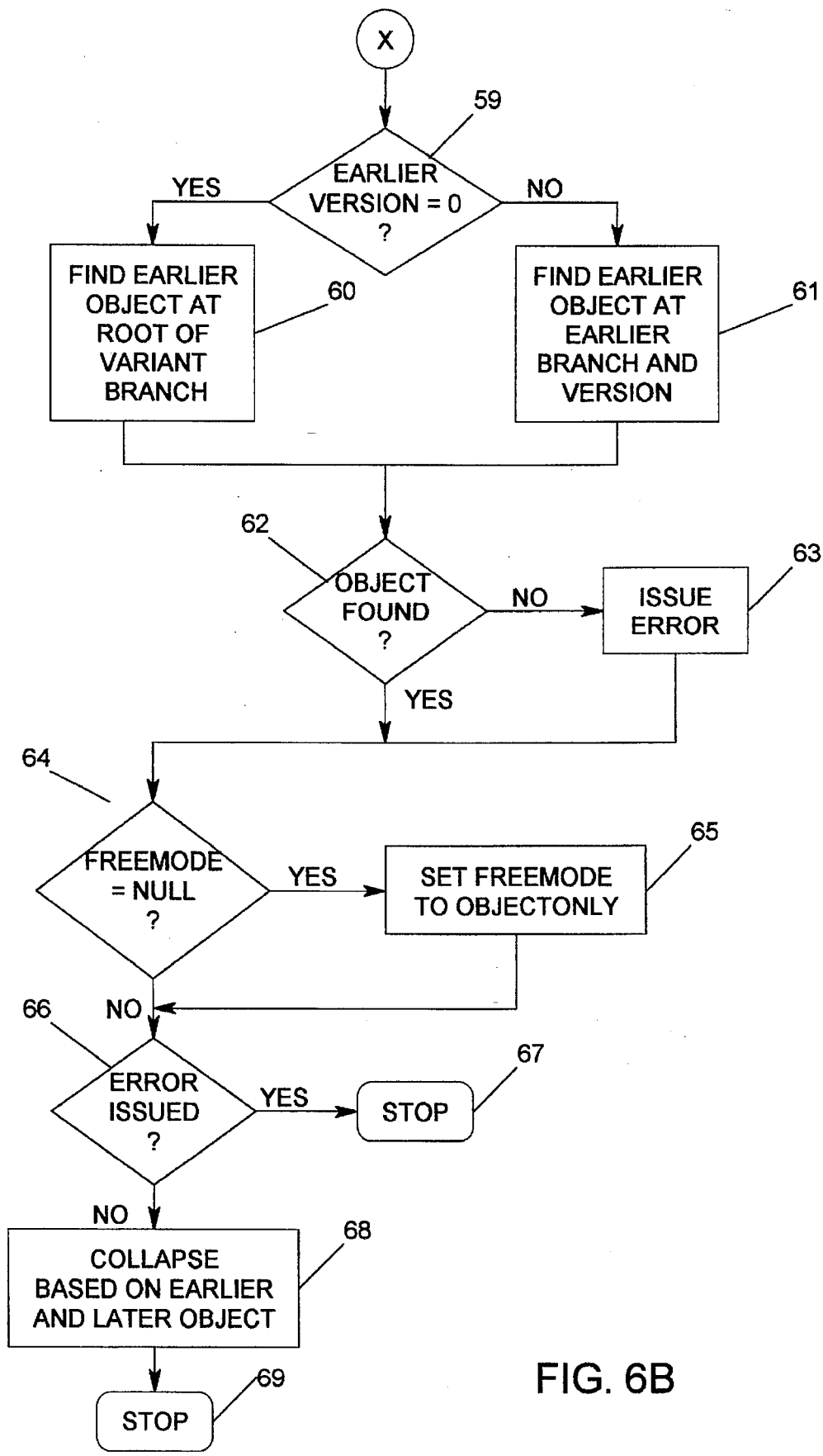

At this juncture of the description, the details of the method of the present invention will be more fully appreciated following the description hereinbelow when taken in conjunction with FIGS. 6A through 10C. Referring now to FIG. 6A, the first of a two-sheet flow chart illustrates the operations; performed in collapsing a version tree, such as that shown in FIG. 3 and described hereinabove, by the use of identifiers.

The process begins with the start bubble 50 and then to a process block 51 wherein the request parameters are validated. Following this step an inquiry is made as depicted by a decision diamond 52 as to whether or not the validation is correct or ("OK"). That is, the collapse request is validated by insuring that (1) the variant name supplied is a viable variant name, and (2) the earlier version number is non-negative. If the answer is no then the process is exited as illustrated by a stop bubble 53. If the validation is correct then a step of initializing earlier and later versioned objects to null is performed (block 54).

Next, it must be determined if the later version number is zero, which process step is depicted by an inquiry diamond 55. If the later version number is not zero, then a process step of locating the object with specified variant and later version number is performed (block 56). An inquiry is made as to whether or not the object was found (diamond 57). If the object was not found then an error is issued as shown by block 58. At this juncture, reference is made to FIG. 6B, as denoted by a connector X, for continuation of this flow-chart description. On the other hand, if the later version is equal to zero (diamond 55), or the object was found (diamond 57), or after an error was issued (block 58), then another inquiry is made as to whether or not the earlier version number is zero (decision diamond 59).

If the earlier version number is zero, then a branch is made to a process step of locating the root object of the specified variant branch (block 60). On the other hand, if the earlier version number is not equal to zero, then a branch is made to another process step of locating the object at earlier branch and version (block 61.). Once either of these process steps (i.e.,blocks 60 or 61) has been completed, then yet another inquiry is made as to whether or not the earlier object was found (diamond 62). If the earlier object was not found then an error is issued as depicted by process block 63. Once this step has been performed or if the object was found then still another inquiry is made as to whether or not the freeMode is null (diamond 64).

If the freeMode is null, then the process step of setting freeMode to objectOnly is performed as shown by a process block 65. Once this process step has been performed or if freeMode is not equal to null, then another inquiry is made as to whether or not any errors have been issued (diamond 66). If any errors have been issued then the process is exited as depicted by a stop bubble 67. On the other hand, if no errors have been issued then a process step of calling collapseVersionsTo (by end object), which is sending a message to earlier object and specifying later object as the end object are performed (block 68). Once these steps have been performed then the process is exited as depicted by a stop bubble 69. The pseudo code for the process described above is set forth in Appendix A hereof.

Figure 7A:
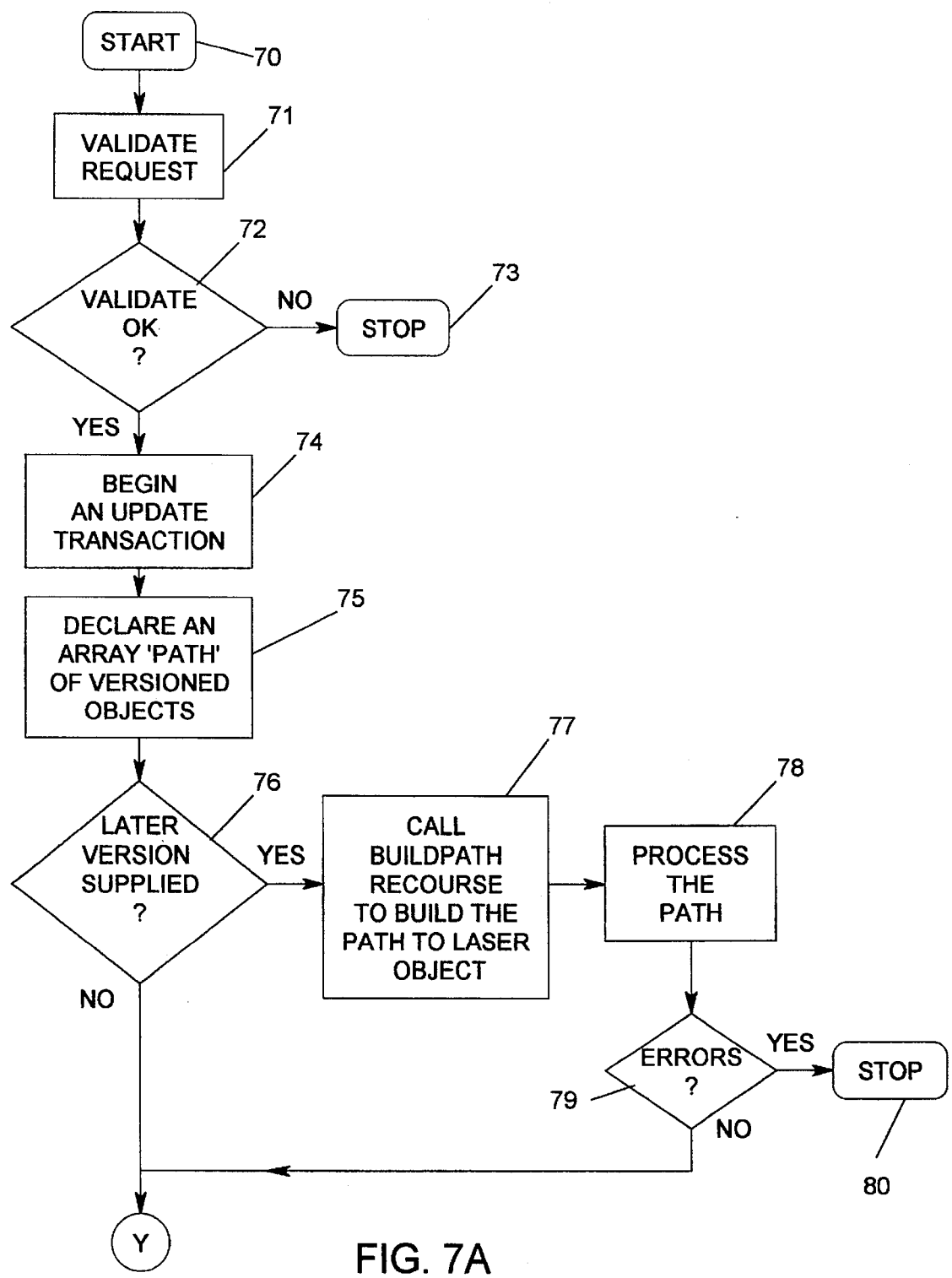
FIGS. 7A and 7B combined are a flow chart that illustrates the; collapsing of a version tree by providing the end object to the target object.
Figure 7B:
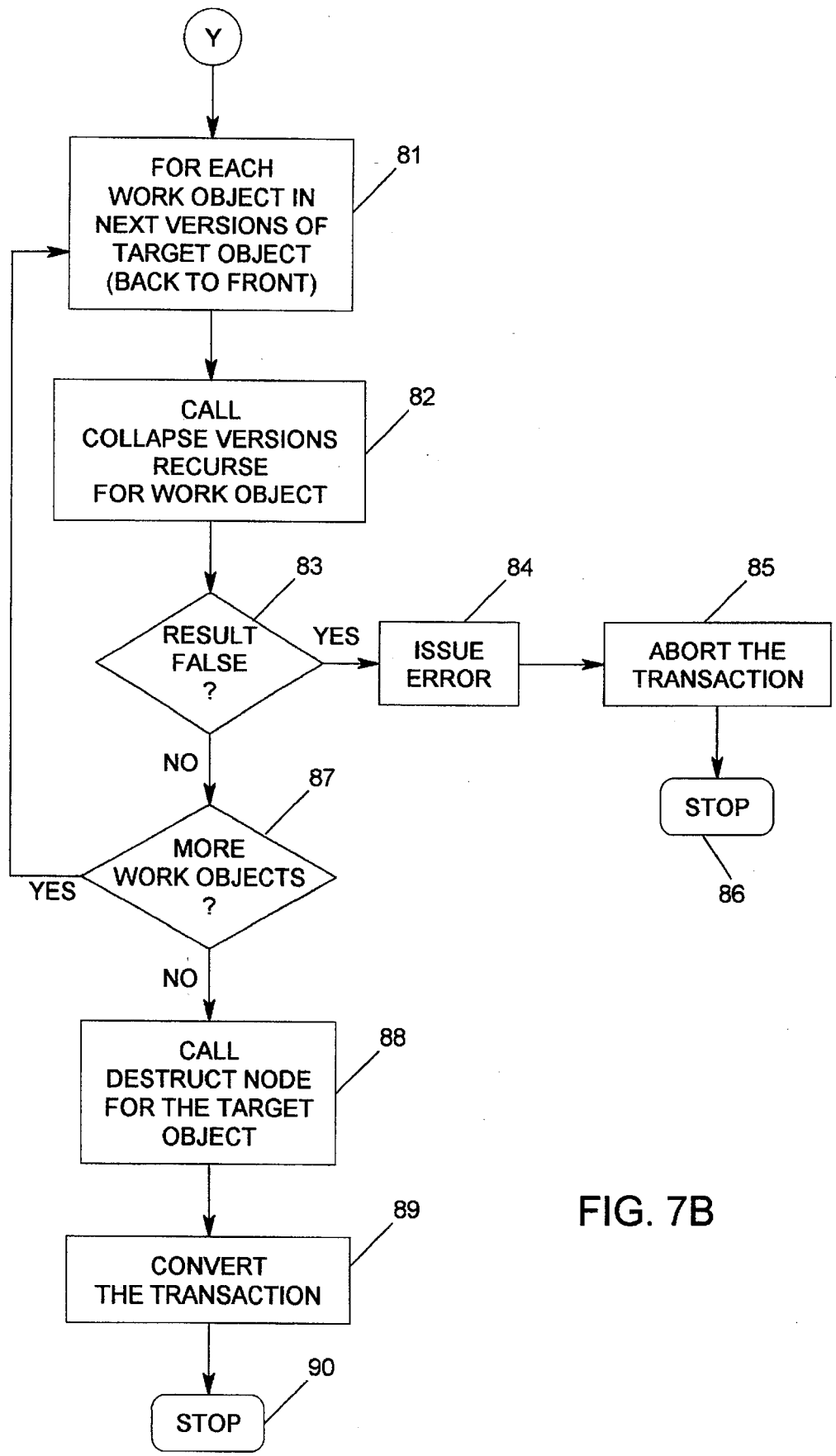

Referring now to FIG. 7A, the first of a two sheet flow chart illustrating a process for collapsing a version tree by providing the end object to the target is shown. The process begins with a start bubble 70 followed by a process step (block 71) for validating the collapse request. This step insures that (1) the target object is not a ghost object, (2) the end object, if supplied, is not a ghost, (3) the end object, if supplied, is in the same version tree as the target object, (4) the end object, if supplied, is on the same variant branch as the target object, and (5) the end object, if supplied, is a later version than the target object. Next an inquiry is made as to whether or not the collapse request is valid (diamond 72). If the request is not valid, then the process is exited as depicted by a stop bubble 73. On the other hand if the request is valid then a process step is entered for beginning an update transaction a represented by a block 74. Following this step, another process step is performed for initializing an empty array which represents the path objects from the target object to the end object (block 75).

An inquiry is next made as to whether or not the end object was supplied (diamond 76). If an end object was supplied then a process step of calling the function to build up the array of objects representing the paths from the target object to the end object is performed (block 77). Next, another process step of processing the path built in the process step depicted by block 77 is performed (block 78). After this process step, another inquiry is made as to whether or not any errors were detected while processing the path (diamond 79). If any errors were detected, then an exit is taken as depicted by stop bubble 80. On the other hand, if no errors were detected, or no end object was supplied (from diamond 76), then a branch is taken to FIG. 7B, as denoted by a connector Y, for a continuation of this flow-chart description. A process sequence is next entered at process block 81 for each nextVersion of the target object. The function to collapse is called for each of the versions as depicted by process block 82. An inquiry is next made as to whether or not the result returned is false (diamond 83). If the answer to this inquiry is yes then an error is issued (block 84) followed by a step of aborting the transaction (block 85), which is followed by an exit of the process (bubble 86). On the other hand if the result was not false, then still another inquiry is made as to whether or not there are more nextVersions (diamond 87). If the answer to this inquiry is yes then a branch is taken back to process block 81 to retrieve the next object.

Once all of the nextVersions have been processed then a process step of calling the function to destruct the target is performed (block 88). Next a process step of committing the transaction is performed (block 89) followed by an exit from the process as depicted by a stop bubble 90. The pseudo code for the process described hereinabove is set forth in Appendix B hereof.

Figure 8B:
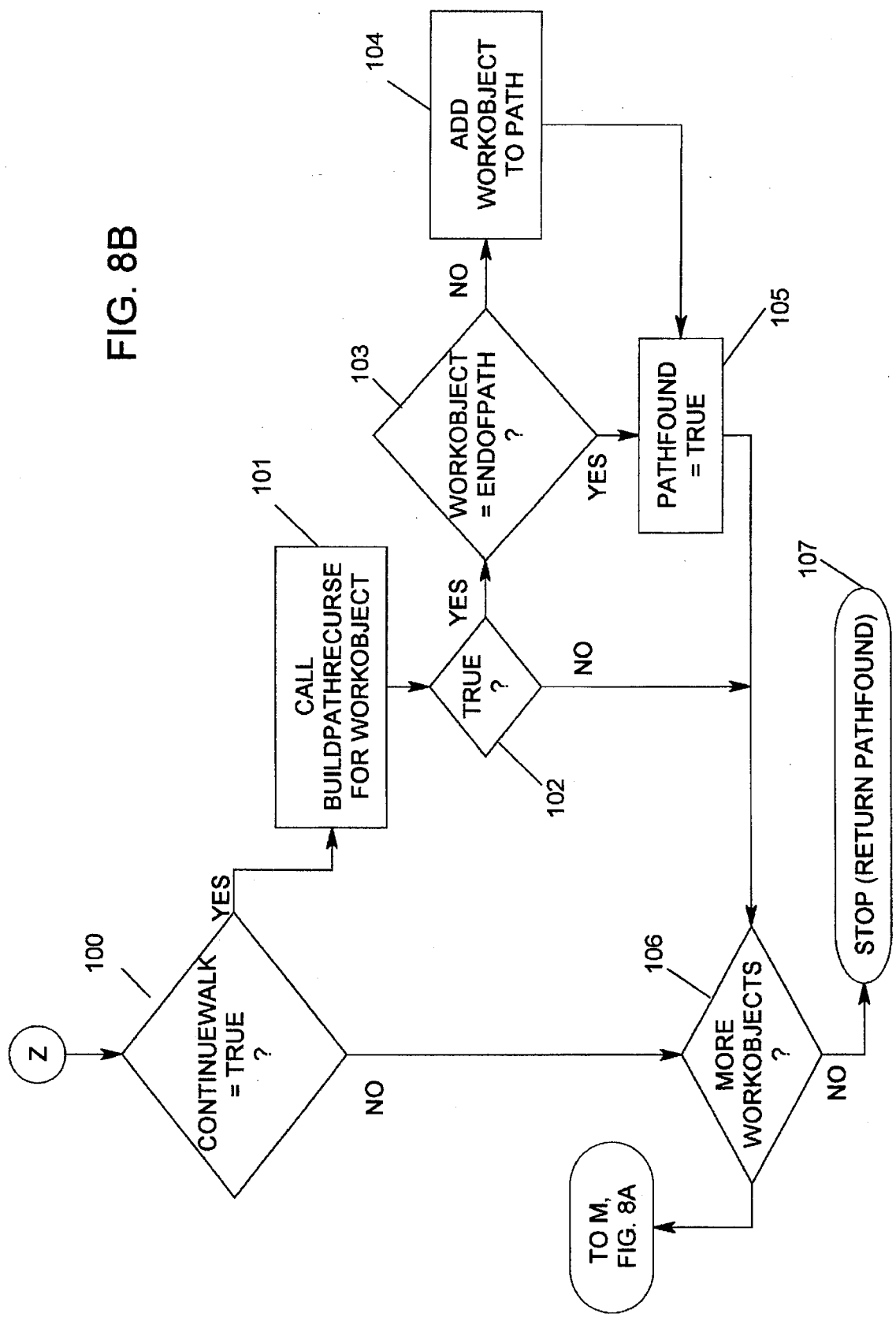

Referring now to FIG. 8A, the first of a two-sheet flow chart illustrates the steps of a recursive process for building the path to collapse. The process begins with a start bubble 91 followed by entry into a sequence of process steps for each nextVersion of the target object, beginning with a process block 92. Next, a process step (block 93) of initializing a continueWalk flag to TRUE is performed. An inquiry is next made as to whether or not this nextVersion is in the path or this nextVersion is the end object (diamond 94). If the answer is yes, then a process step for setting pathFound to TRUE is performed (block 95). On the other hand, if the answer to this inquiry is no then another inquiry is made as to whether or not the variant name of thisVersion is the same as the variant name of the target object (diamond 96). If the variant name of the nextVersion is not the same as the variant name of the endObject, then yet another inquiry is made as to whether the variant of the workObject is the same as the variant of EndOfPath (diamond 97). If the answer to this inquiry is no then another inquiry is made as to whether or not the nextVersion is the start of a branch (diamond 98). If it is not, then a process step of setting continueWalk to FALSE is performed (block 99). It is pointed out that the term nextVersion refers to a collection of objects, and the term workObject refers to each object obtained during the performance of the process. At this juncture, reference is made to FIG. 8B, as denoted by a connector Z, for a continuation of this flow-chart description.

Following the process step depicted by the block 99, or the yes branch from any of the diamonds 96, 97, or 98, or after the process step block 99 entry is made to a decision diamond 100 to inquire if continueWalk is TRUE. If the answer to this inquiry is yes, then a process step of calling the function to collapse the versions starting from this nextVersion is performed (block 101). Another inquiry is made after this step as to whether or not the function returned is TRUE (diamond 102). If it is TRUE then another inquiry is made as to whether or not this nextVersion is the end of the path (diamond 103). If it is not the end of the path then a process step of adding this nextVersion to the path is performed (block 104). If the nextVersion is the end of the path or after the adding step (block 104) is complete, another process step of setting pathFound to TRUE is performed (block 105).

If the answer to the inquiry if continueWalk is TRUE (diamond 100), or if the function returned is not TRUE (diamond 102) or after the step of setting pathFound to TRUE (block 105) entry is made to yet another decision diamond 106 to inquire if there are more nextVersions. If the answer is yes then a branch is taken back to the process step depicted by the block 92 to start the process anew. If the answer is no then the process is exited as depicted by a stop bubble 107 and the pathFound is returned. The pseudo code for the above-described process is set forth in Appendix C hereof.

Figure 9A:
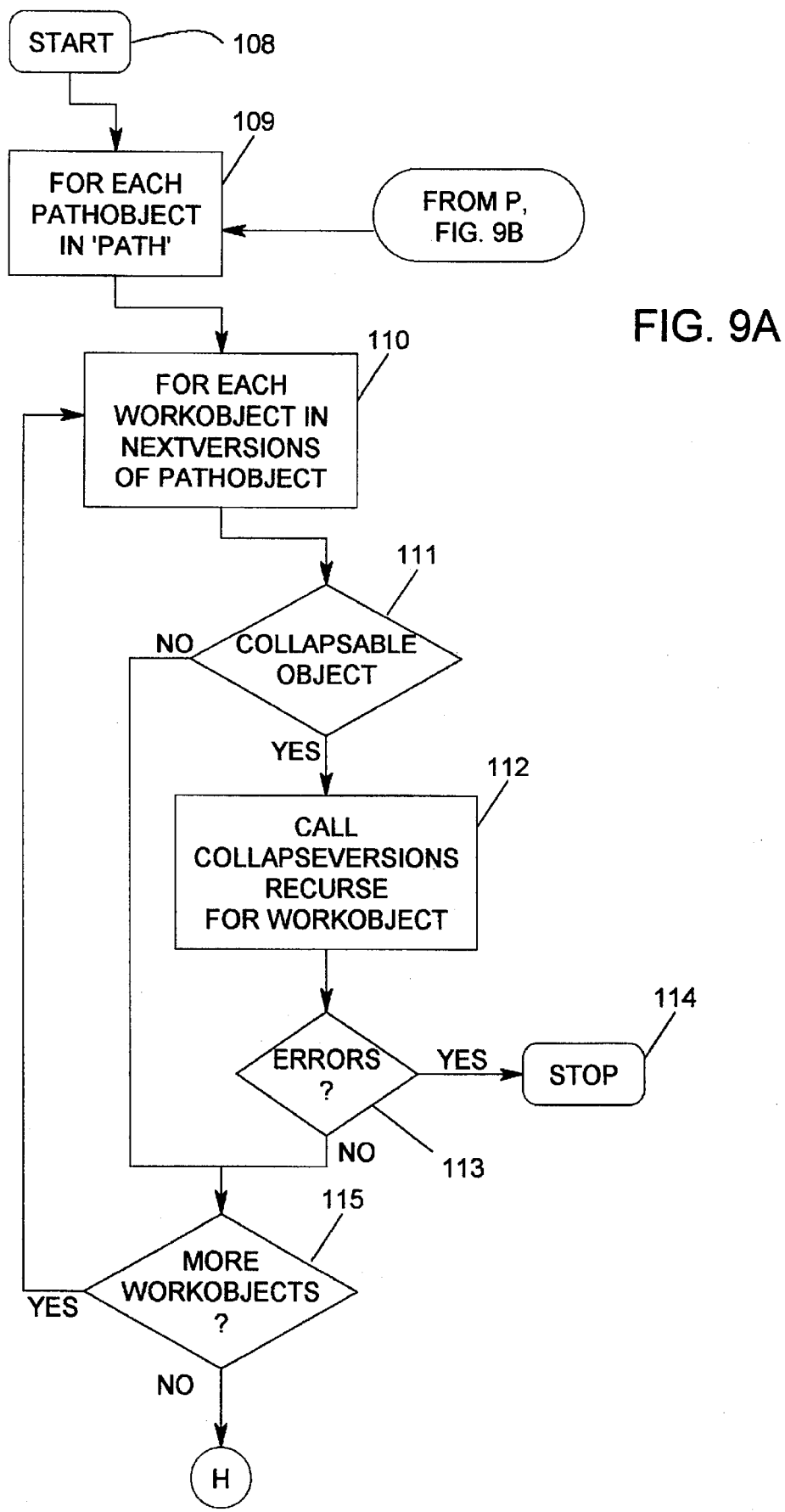
FIGS. 9A and 9B is a flow chart showing the steps of; processing the path in collapseVersionsTo.
Figure 9B:
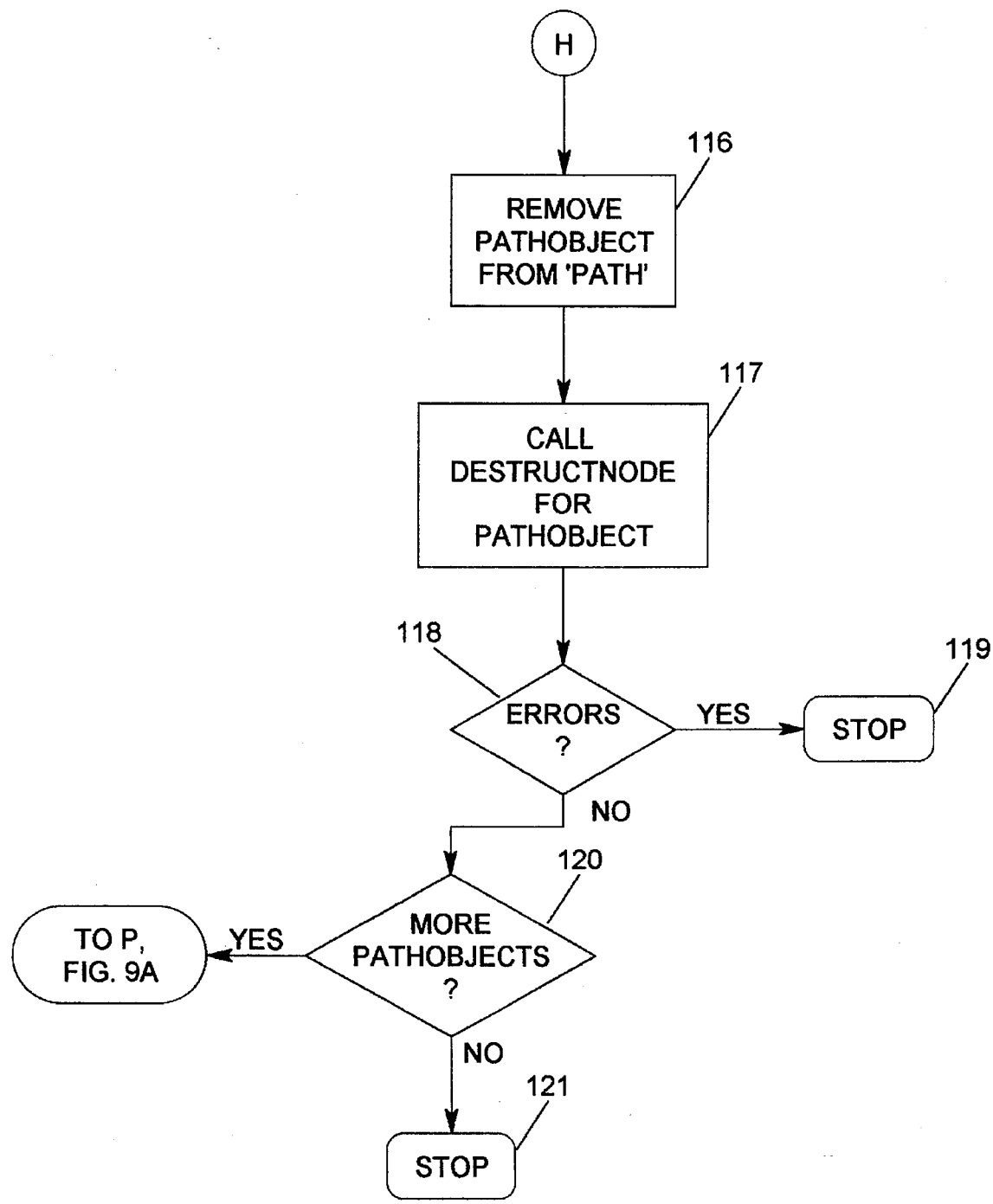

Referring now to FIG. 9A, the first of a two-sheet flow chart illustrating the steps for collapsing the path in collapseVersionsTo is shown. The process begins with a start bubble 108 followed by a sequence of process steps for each object in the path (block 109) and another process step for each nextVersion of this path object (block 110). If this object can be collapsed (diamond 111), which means (1) this object is not part of the path (2) this object is not the later version object (3) this object is not the result of a merge operation. If the answer to this inquiry is yes then the process step of calling the function to collapse the versions starting from this object (block 112). Next, an inquiry is made as to whether or not there are any errors (diamond 113). If any errors were detected then the process is exited as depicted by a stop bubble 114. On the other hand if there were no errors, or the object is not collapsible (diamond 111) then yet another inquiry is made as to whether or not there are more nextVersions (diamond 115). If the answer to this inquiry is yes then a return is made back to the process block 110 for the next nextVersion. If there are no more nextVersions then a branch is taken to FIG. 9B, as denoted by a connector H, wherein; a process step of removing the current path object from the path is performed (block 116). Next another process step of calling the function to destruct the current path object is performed (block 117).

An inquiry is next made as to whether or not there were any errors (diamond 118). If an error was detected, then the process is exited as depicted by a stop bubble 119. On the other hand if there were no errors, then an inquiry is made as to whether or not there are more path objects (diamond 120). If yes, then a return is made back to process block 109 to begin the process anew. On the other hand if there are no more path objects then the process is exited as depicted by a stop bubble 121. The pseudo code for the above-described process is set forth in Appendix D hereof.

Figure 10A:
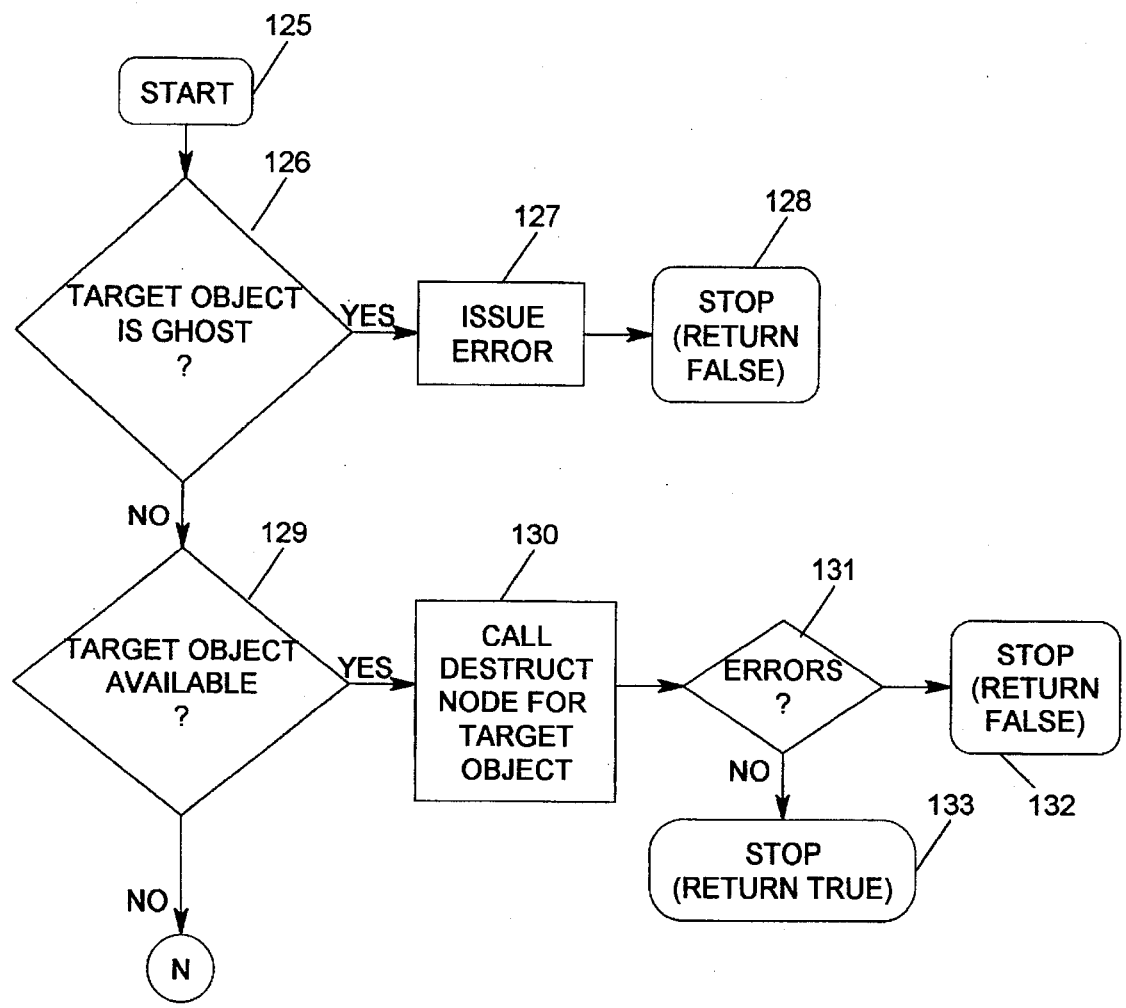
FIGS. 10A, 10B and 10C combined are a flow chart illustrating the steps of; a recursive process for collapsing versioned objects out of the tree.

Referring now to FIG. 10A, the first of a three-sheet flow chart illustrating the steps of a recursive process for collapsing versioned objects out of the tree is shown. The process begins with a start bubble 125 followed by an inquiry as to whether or not the target object state is ghost (diamond 126). If the answer to this inquiry is yes then an error is issued (block 127), return is set to FALSE and the process is exited as depicted by block 128. If the target object is not ghost, then another inquiry is made as to whether or not the target object is available (diamond 129). If the target object is available then a process step of calling the function to destruct the current object is performed (block 130). Next an inquiry is made as to whether or not any errors were detected (diamond 131). If any errors were detected then the process is exited and return is set to FALSE (block 132). On the other hand if no errors were detected then the process is also exited, returning TRUE (block 133).

Figure 10B:
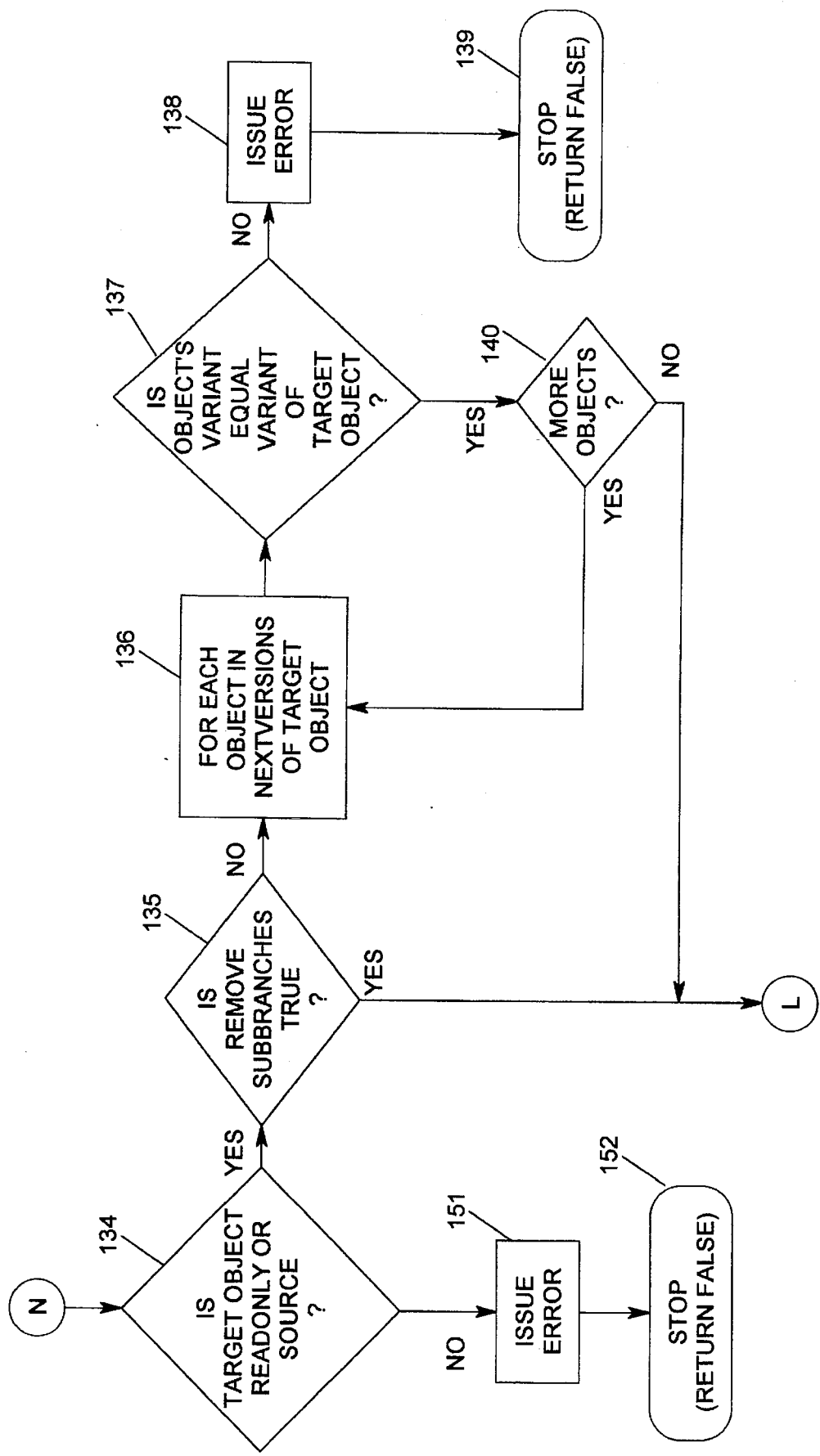

If the target object is not available, then a branch is taken to a continuation of the flow chart in FIG. 10B, as denoted by a connector. An inquiry is made as to whether or not it is readOnly or source (diamond 134). If the answer to this inquiry is yes then another inquiry is made as to whether or not remove sub-branches is TRUE (diamond 135). That is, if remove sub-branches was not indicated, prechecking that it is worth continuing the recursive walk by performing the after-described steps denoted by reference numbers 136–140 hereinbelow. If the answer is not TRUE, then a sequence is entered for each nextVersion of the target object starting with process block 136. Next an inquiry is made if the variant name of this object is the same as the variant name of target object, which inquiry is depicted by a decision diamond 137. If it is not the same, then an error is issued (block 138), the process is exited and return is set to FALSE (block 139). On the other hand if it is the same, then an inquiry is made as to whether or not there are more objects (diamond 140). If the answer is yes then a branch is taken back to block 136 for processing anew.

Figure 10C:
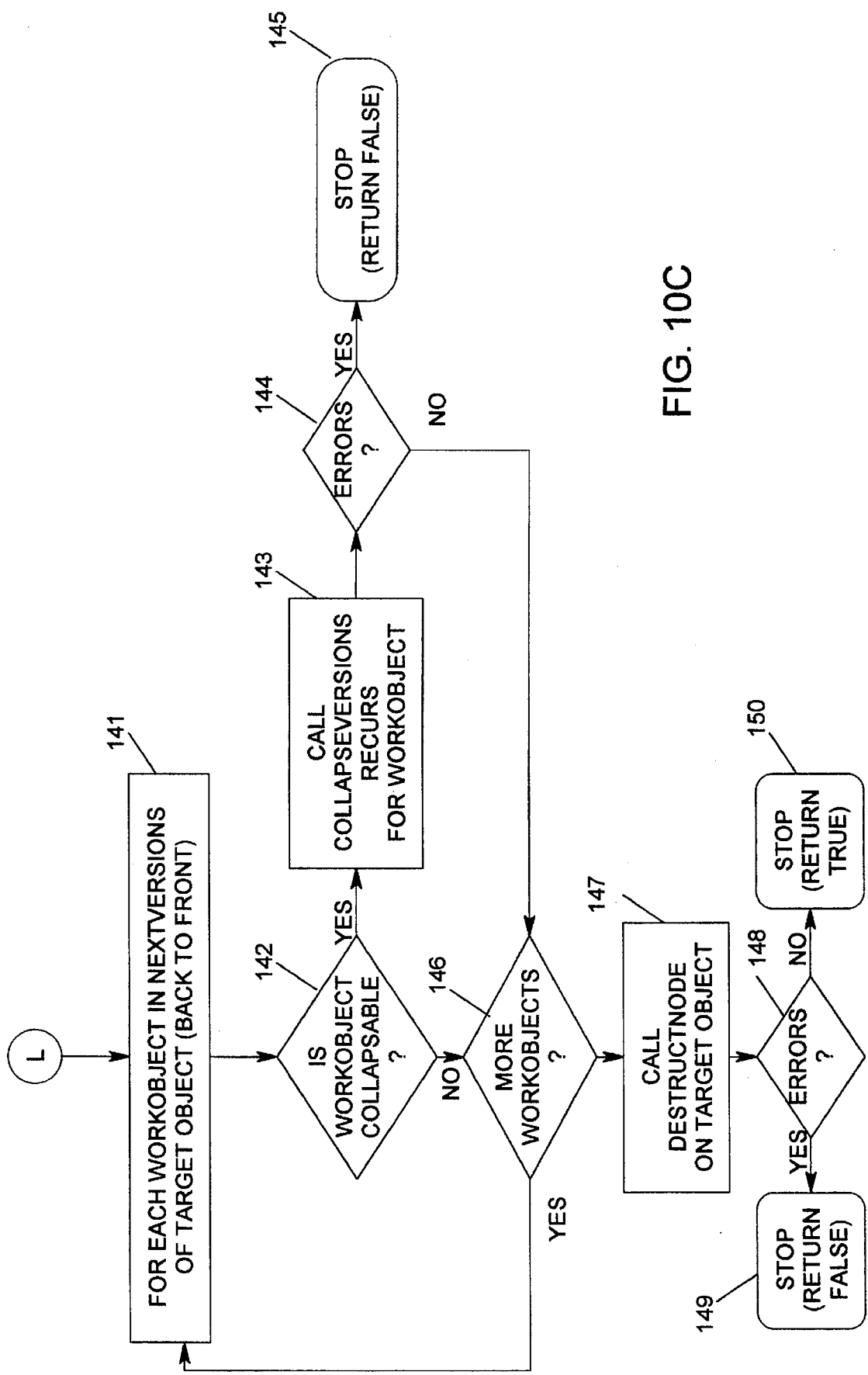

Once all the nextVersions have been processed as above, or the answer to the inquiry in the diamond 135 is yes; a branch is taken to FIG. 10C, as denoted by a connector L, for a continuation of the flow-chart description. Another sequence of process steps for each nextVersion is entered at a process block 141. Next an inquiry is made if this object can be collapsed, which means (1) this object is not the result of a merge or (2) this object is on the same variant branch as the target object (decision diamond 142). If the answer to this inquiry is yes, then a process step for calling the function to collapse the versions starting from the nextVersion of the step depicted by process block 141 is performed (block 143). Next an inquiry is made as to whether or not there were any errors (decision diamond 144). If an error was detected an exit from the process is taken, returning FALSE (block 145). On the other hand if no errors were detected or if the answer to the inquiry in diamond 142 is no, then an inquiry is made as to whether or not there are more workObjects as depicted by a decision diamond 146. If yes, then a return is made to the step depicted by the block 141, and if no a process step of calling the function to destruct the current object is performed (block 147).

After this process step another inquiry is made as to whether or not any errors were detected (diamond 148). If an error was detected, then the process is exited, returning FALSE (block 149). If no error was detected, then the process is also exited, returning TRUE (block 150). Referring back to decision diamond 134 in FIG. 10B, if the answer to this inquiry is that the target object is not readOnly or source, then an error is issued (block 151); and, the process is exited, returning FALSE (block 152). The pseudo code for the process described above is set forth in Appendix E hereof.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDIX A

Page 1 of 2

The collapseVersionsTo (by identifiers)-Pseudo Code performs the following steps:

| Reference Number | Pseudo Code |
| --- | --- |
| 50 | Enter |
| 51 | Define a UrepBoolean errorPushed = FALSE<br>If variant ==the current variant branch flag<br>or variant =="*"(meaning any variant)<br>  Issue invalidVariant error and set<br>  errorPushed = TRUE<br>If earlierVersion < 0<br>  Issue invalidEarlierVersion error and<br>  set errorPushed = TRUE |
| 52,53 | If errorPushed == TRUE<br>Exit |
| 54 | Define null UrepVersionedObjects earlierObject and laterObject |
| 55–58 | If laterVersion is not null and laterVersion==0 |
| 59–61 | If earlierVersion is null or earlierVersion = TRUE<br>  earlierObject = result of findVersion on "this" and variant |

| Reference Number | Pseudo Code |
|---|---|
| | else<br>earlierObject = result of findVersion on "this" with parameters earlierVersion and variant |
| 62,63 | If earlierObject is null<br>    Issue noSuchLaterVersion error and set errorPushed = TRUE |
| 64,65 | If freeMode is null<br>    freeMode = objectOnly |
| 66,67 | If errorPushed == TRUE<br>    Exit |
| 68 | Call collapseVersionsTo on earlierObject with parameters freeMode, laterObject, and removeSubbranches |
| 69 | Exit |

APPENDIX B

Page 1 of 2

| Reference Number | Pseudo Code |
|---|---|
| 70 | Enter |
| 71-73 | Define a UrepId myVariantName variantName of "this"<br>If reserveStatus of "this" == ghost and previousVersions of "this" is not null<br>    Issue notValidForGhost error and exit<br>If laterVersion is valid<br>Define a UrepBoolean errorPushed = FALSE<br>If reserveStatus of laterVersion ==ghost<br>    Issue cannotCollapseToGhost error and set errorPushed = TRUE<br>If findRootInternal of "this" !=<br>findRootInternal of laterVersion<br>    Issue differentLogicalObject error and set errorPushed = TRUE<br>else<br>If versionNumber of "this" >= versionNumber of laterVersion<br>    Issue notADescendant error and set errorPushed = TRUE<br>If errorPushed == TRUE<br>Exit |
| 74 | Begin an update transaction |
| 75 | Declare a UrepArray of UrepVersionedObjects called path |
| 76-80 | If laterVersion is valid<br>Call buildPathRecurse on "this" with parameters "this", laterVersion, and path (the processPath logic -see next process- which is part of this method is present here)<br>If any errors occurred in the processPath logic, the transaction is aborted and this process is exited |
| 81-87 | For the number of nextVersions of "this", working backwards through the array of nextVersions<br>If the next nextVersion != later version and the number of previousVersions of this next nextVersion<br>Call collapseVersionRecurse of this next nextVersion with parameters myVariantName,<br>If the call returns FALSE<br>    Issue cannotCollapseVersions error<br>    Abort the update transaction<br>    Exit |
| 88 | Call destructNode on "this" with parameter freeMode |
| 89 | commit the update transaction |
| 90 | Exit |

APPENDIX C

Page 1 of 1

| Reference Number | Pseudo Code |
|---|---|
| 91 | Enter<br>Declare a UrepBoolean pathFound = FALSE<br>Declare a UrepBoolean continueWalk = FALSE<br>Declare a UrepId myVariantName = variantName of "this" |
| 92-106 | For the number of objects in nextVersions of "this"<br>continueWalk = TRUE<br>Define a UrepVersionedObject workObject = the current nextVersion<br>If path contains workObject or workObject == endOfPath<br>    pathFound = TRUE<br>else<br>If variantName of workObject !=<br>myVariantName<br>    if variantName or workObject !=<br>    variantName of endOfPath<br>If findNext with parameters workObject, searchUp, same variant indicator is valid<br>continueWalk = FALSE<br>If continueWalk == TRUE<br>Call buildBathRecurse on workObject with parameters "this", endOfPath, and path<br>If the function returns TRUE<br>If workObject !=endOfPath<br>Add workObject to path<br>pathFound = TRUE |
| 107 | Exit, returning pathFound |

APPENDIX D

Page 1 of 2

| Reference Number | Pseudo Code |
|---|---|
| 108 | Enter |
| 109-120 | For the number of objects in path, working backwards through the array<br>Define a UrepVersionedObject pathObject = the current path member<br>For the number of nextVersions in pathObject, working backwards through the array<br>Define a UrepVersionedObject workObject = the current nextVersions member<br>If path does not contain workObject and workObject !=later Version and workObject has one previousVersion<br>Call collapseVersionoRecurse on workObject with parameters myVariantName, freeMode and removeSubbranches |

-continued

| Reference Number | Pseudo Code |
|---|---|
| | If the result is FALSE<br>  Issue<br>    cannotCollapseVersions<br>    error<br>  Abort the update<br>    transaction<br>  Exit |
| 109–120 errors Cont'd. | Capture the current number of<br><br>Remove pathObject from path<br>Call destructNode on pathObject with parameter freeMode<br>If there are additional errors<br>  Issue cannotCollapseVersions<br>    error<br>  Abort the update transaction<br>  Exit |
| 121 | Exit |

APPENDIX E

Page 1 of 2

| Reference Number | Pseudo Code |
|---|---|
| 125 | Enter<br>Define a UrepReserveStatus = myReserveStatus of "this" |
| 126–128 | If myReserveStatus == ghost<br>  Issue cannotDeleteBranchWithGhost error<br>  Exit, returning FALSE |
| 129–133 | If myReserveStatus == available<br>  Capture the current number of errors<br>  Call destructNode on "this" with parameter freeMode<br>  If the number of errors increased<br>    Exit, returning FALSE<br>  else<br>    Exit, returning TRUE |
| 134 | If myReserveStatus == readOnly or myReserveStatus == source |
| 135–140 | If removeSubbranches == FALSE<br>  For the number of objects in nextVersions of "this"<br>    If variantName of "this" != variantName of the current nextVersion<br>      Issue<br>        cannotDeleteBranchWith Subbranches error<br>      Exit, returning FALSE |
| 141–146 | For the number of objects in nextVersions of "this"<br>  Define a UrepVersioned Object workObject = the current nextVersion |
| 141–146 | If the number of previousVersions of workObject == 1 or variantName of this == variantName of workObject<br>  Call collapseVersionsRecurse on workObject with parameters variant, freeMode and removeSubbranches<br>  If the result is FALSE<br>    Exit, returning FALSE |
| 147–150 | Capture the current number of errors<br>Call destructNode on "this" with parameter freeMode<br>If the number of errors increased<br>  Exit, returning FALSE<br>else |

-continued

| Reference Number | Pseudo Code |
|---|---|
| cont'd. | Exit, returning TRUE |

What is claimed is:

1. In a computer system having a user interface, a memory, a database and repository operative in said computer system for accessing said database, a method implemented by said computer system for collapsing a version tree that depicts a history of objects stored in said database, said method being stored in said memory at run time and comprising the steps of:

a. validating collapse request by insuring that target object is not a ghost object, the end object is not a ghost, end object is on the same version tree as said target object, and end object is a later version than said target object;

b. initializing an empty array representing path objects from said target object to said end object;

c. if an end object is supplied, calling a function to build up an array of objects representing paths from said target object to said end object, processing said array of objects built up in step c hereof;

d. for each nextVersion of said target object, calling a function to collapse versions starting from nextVersion;

e. calling a function to destruct said target object;

f. for each nextVersion of target object, initializing a continueWalk flag to TRUE;

g. if this nextVersion is in path, setting pathFound to TRUE;

h. if this nextVersion is not in the path, and if variant name of this nextVersion is not the same as the variant name of target object, and if variant name of nextVersion is not the same as variant name of endObject, and if workObject is not the start of a branch, setting continueWalk to FALSE;

i. if this nextVersion is the end object, setting pathFound to TRUE;

j. if this nextVersion is not the end object, and if variant name of this nextVersion is not the same as the variant name of target object, and if variant name of nextVersion is not the same as variant name of endObject, and if workObject is not the start of a branch, setting continueWalk to FALSE;

k. if continueWalk is TRUE, calling a function to continue building a path starting from this nextVersion;

l. if said function returned TRUE, and if this nextVersion is not the endObject, adding this nextVersion to said path;

m. setting pathFound to TRUE;

n. if there are more workObjects, repeating the process steps above until all workObjects have been processed; and, o. exiting this process and returning a value for pathFound.

2. The method as in claim 1 wherein said step of processing said array further includes the steps of:

a. for each object in the path and for each nextVersion of this path object and if this object is not part of the path, is not later version object and not a result of a merge, calling a function to collapse versions starting from this object;

b. if errors detected, exiting this process;

c. if there are more nextVersions, returning to step a hereof;

d. removing current path object form the path;

e. calling a function to destruct current path object;

f. if errors detected, exiting this process; and g. if there are more path objects, repeating all steps hereof until all path objects are processed.

3. The method as in claim 2 further including the steps of:

a. if target object state is readOnly and if remove sub-branches was not indicated, prechecking that it is worth continuing recursive walk by;

b. for each nextVersion of target object, if variant name of this object is not the same as variant name of target object, issuing an error and exiting process, returning FALSE; and, c. if there are more nextVersions, repeating step a hereof until all nextVersions have been processed.

4. The method as in claim 3 further including the steps of:

a. for each nextVersion of target object, if this can be collapsed, calling a function to collapse versions starting from nextVersion of this step;

b. if errors detected, exiting this process returning FALSE; and, c. if there are more nextVersions, repeating step a hereof until all nextVersions have been processed.

5. The method as in claim 4 further including the steps of:

a. calling a function to destruct current path object;

b. if errors detected, exiting this process returning FALSE;

c. if no errors detected, exiting this process returning TRUE.

6. The method as in claim 2 further including the steps of:

a. if target object state is source and if remove sub-branches was not indicated, prechecking that it is worth continuing recursive walk by;

b. for each nextVersion of target object, if variant name of this object is not the same as variant name of target object, issuing an error and exiting process, returning FALSE; and, c. if there are more nextVersions, repeating step a hereof until all nextVersions have been processed.

7. The method as in claim 6 further including the steps of:

a. for each nextVersion of target object, if this can be collapsed, calling a function to collapse versions starting from nextVersion of this step;

b. if errors detected, exiting this process returning FALSE; and, c. if there are more nextVersions, repeating step a hereof until all nextVersions have been processed.

8. The method as in claim 7 further including the steps of:

a. calling a function to destruct current path object;

b. if errors detected, exiting this process returning FALSE;

c. if no errors detected, exiting this process returning TRUE.

9. The method as in claim 2 wherein said step of calling a function to collapse versions further includes the steps of:

a. if target object state is available, calling a function to destruct current path object;

b. if there were errors, exiting and returning FALSE; and, c. if there were no errors, returning TRUE.

10. In a computer system having a user interface, a memory, a database and repository operative in said computer system for accessing said database, a method implemented by said computer system for collapsing a version tree that depicts a history of objects stored in said database, said method being stored in said memory at run time and comprising the steps of:

a. validating a collapse request by insuring that variant name supplied is a viable variant name and earlier version number is non-negative;

b. if collapse request is not valid, exiting this process;

c. initializing to null the earlier and later versioned objects;

d. if later version number is not zero, locating object with specified variant and later version number;

e. if later object not found, issuing an error;

f. if earlier version number is zero, locating root object of specified variant branch;

g. if earlier version number is not zero, locating object at earlier branch and version;

h. sending message to earlier object;

i. specifying later object as end object;

j. validating collapse request by insuring that target object is not a ghost object, the end object is not a ghost, end object is on the same version tree as said target object, and end object is a later version than said target object;

k. initializing an empty array representing path objects from said target object to said end object;

l. if an end object is supplied, calling a function to build up an array of objects representing paths from said target object to said end object, and processing said array of objects built up in this step;

m. for each nextVersion of said target object, calling a function to collapse versions starting from nextVersion;

n. calling a function to destruct said target object; and, o. exiting the process.

11. The process as in claim 10 wherein said step of calling a function to build further includes the steps of:

a. for each nextVersion of target object, initializing a continueWalk flag to TRUE;

b. if this nextVersion is in path, setting pathFound to TRUE; and, c. if this nextVersion is not in the path, and if variant name of this nextVersion is not the same as the variant name of target object, and if variant name of nextVersion is not the same as variant name of endObject, and if workObject is not the start of a branch, setting continueWalk to FALSE.

12. The process as in claim 11 further including the steps of:

a. if this nextVersion is the end object, setting pathFound to TRUE; and, b. if this nextVersion is not the end object, and if variant name of this nextVersion is not the same as the variant name of target object, and if variant name of nextVersion is not the same as variant name of endObject, and if workObject is not the start of a branch, setting continueWalk to FALSE.

13. The method as in claim 12, further including the steps of:

a. if continueWalk is TRUE, calling a function to continue building a path starting from this nextVersion;

b. if said function returned TRUE, and if this nextVersion is not the endObject, adding this nextVersion to said path;

c. setting pathFound to TRUE;

d. if there are more workObjects, repeating the process steps above until all workObjects have been processed; and, e. exiting this process and returning a value for pathFound.

14. The method as in claim 13 wherein said step of processing said array further includes the steps of:

a. for each object in the path and for each nextVersion of this path object and if this object is not part of the path, is not later version object and not a result of a merge, calling a function to collapse versions starting from this object;

b. if errors detected, exiting this process;

c. if there are more nextVersions, returning to step a hereof;

d. removing current path object form the path;

e. calling a function to destruct current path object;

f. if errors detected, exiting this process; and g. if there are more path objects, repeating all steps hereof until all path objects are processed.

15. The method as in claim 14 wherein said step of calling a function to collapse versions further includes the steps of:

a. if target object state is available, calling a function to destruct current path object;

b. if there were errors, exiting and returning FALSE; and, c. if there were no errors, returning TRUE.

16. The method as in claim 15 further including the steps of:

a. for each nextVersion of target object, if this can be collapsed, calling a function to collapse versions starting from nextVersion of this step;

b. if errors detected, exiting this process returning FALSE; and, c. if there are more nextVersions, repeating step a hereof until all nextVersions have been processed.

17. The method as in claim 16 further including the steps of:

a. calling a function to destruct current path object;

b. if errors detected, exiting this process returning FALSE;

c. if no errors detected, exiting this process returning TRUE.

18. The method as in claim 15 further including the steps of:

a. if target object state is readOnly and if remove subbranches was not indicated, prechecking that it is worth continuing recursive walk by;

b. for each nextVersion of target object, if variant name of this object is not the same as variant name of target object, issuing an error and exiting process, returning FALSE; and, c. if there are more nextVersions, repeating step a hereof until all nextVersions have been processed.

19. The method as in claim 14 further including the steps of:

a. if target object state is source and if remove subbranches was not indicated, prechecking that it is worth continuing recursive walk by;

b. for each nextVersion of target object, if variant name of this object is not the same as variant name of target object, issuing an error and exiting process, returning FALSE; and, c. if there are more nextVersions, repeating step a hereof until all nextVersions have been processed.

20. The method as in claim 19 further including the steps of:

a. for each nextVersion of target object, if this can be collapsed, calling a function to collapse versions starting from nextVersion of this step;

b. if errors detected, exiting this process returning FALSE; and, c. if there are more nextVersions, repeating step a hereof until all nextVersions have been processed.

21. The method as in claim 20 further including the steps of:

a. calling a function to destruct current path object;

b. if errors detected, exiting this process returning FALSE;

c. if no errors detected, exiting this process returning TRUE.

22. A process as in claim 10 further including the steps of:

a. if earlier object was not found, issuing an error.

23. A process as in claim 10 further including the steps of:

a. if freeMode is null, setting freeMode to objectOnly; and, b. if any errors issued, exiting the process.

* * * * *